United States Patent
Heinze et al.

(10) Patent No.: US 9,590,467 B2
(45) Date of Patent: Mar. 7, 2017

(54) DRIVE ARRANGEMENT FOR AN ADJUSTING ELEMENT OF A MOTOR VEHICLE

(71) Applicant: BROSE FAHRZEUGTEILE GMBH & CO. KG, COBURG, Coburg (DE)

(72) Inventors: Sebastian Heinze, Sachsenbrunn (DE); Alwin Macht, Ebensfeld (DE)

(73) Assignee: Brose Fahrzeugteile GmbH & Co. KG, Coburg, Coburg (DE)

( * ) Notice: Subject to any disclaimer, the term of this patent is extended or adjusted under 35 U.S.C. 154(b) by 0 days.

(21) Appl. No.: 14/347,865

(22) PCT Filed: Sep. 27, 2012

(86) PCT No.: PCT/EP2012/004062
§ 371 (c)(1),
(2) Date: Mar. 27, 2014

(87) PCT Pub. No.: WO2013/045099
PCT Pub. Date: Apr. 4, 2013

(65) Prior Publication Data
US 2014/0232225 A1 Aug. 21, 2014

(30) Foreign Application Priority Data

Sep. 27, 2011 (DE) .................... 20 2011 106 110 U (51) Int. Cl.
*B60W 10/18* (2012.01)
*H02K 7/06* (2006.01)
(Continued)

(52) U.S. Cl.
CPC ............ *H02K 7/06* (2013.01); *E05F 15/603* (2015.01); *F16D 41/105* (2013.01); *F16D 43/02* (2013.01);
(Continued)

(58) Field of Classification Search
CPC .......... H02K 7/06; H02K 7/102; H02K 7/108; E05F 15/603; F16D 43/02; F16D 41/105;
(Continued)

(56) References Cited

U.S. PATENT DOCUMENTS 2,597,798 A 5/1952 Houplain
4,607,180 A * 8/1986 Stoody ................ F16H 25/2018
310/112

(Continued)

FOREIGN PATENT DOCUMENTS

DE 4328699 3/1995
DE 19581436 2/2000
(Continued)

OTHER PUBLICATIONS

"German Search Report," for German Patent Application No. 202011106110.1, mailed Mar. 6, 2012 (5 pages).

(Continued)

*Primary Examiner* — David J Hlavka
(74) *Attorney, Agent, or Firm* — Pauly, DeVries Smith & Deffner, LLC (57) ABSTRACT

The invention relates to a drive arrangement for an adjusting element of a motor vehicle, a clutch arrangement which is connected into the drive train with a drive connection and a driven connection, the clutch arrangement at any rate forwarding a movement which is introduced on the drive side to the driven connection and having a braking arrangement for braking a movement which is introduced on the output side. The braking arrangement has a braking element which can be adjusted counter to a braking force, in that, between the output connection and the braking element, the clutch arrangement has a freewheel arrangement comprising at least one freewheel pair of clamping body freewheels which operate in opposite directions, in that a movement which is (Continued)

introduced on the output side always brings about the blocking of at least one clamping body freewheel and is correspondingly braked via the braking arrangement.

20 Claims, 5 Drawing Sheets (51) Int. Cl.
| | | |
|---|---|---|
| F16D 41/10 | (2006.01) | |
| F16D 43/02 | (2006.01) | |
| H02K 7/102 | (2006.01) | |
| H02K 7/108 | (2006.01) | |
| E05F 15/603 | (2015.01) | |

(52) U.S. Cl.
CPC ............ *H02K 7/102* (2013.01); *H02K 7/108* (2013.01); *E05Y 2201/21* (2013.01); *E05Y 2201/216* (2013.01); *E05Y 2201/26* (2013.01); *E05Y 2201/266* (2013.01); *E05Y 2900/531* (2013.01)

(58) Field of Classification Search
CPC ........... E05Y 2201/216; E05Y 2201/21; E05Y 2201/266; E05Y 2201/26; E05Y 2900/531
See application file for complete search history.

(56) References Cited

U.S. PATENT DOCUMENTS

| | | | | |
|---|---|---|---|---|
| 5,582,279 | A * | 12/1996 | Buchanan, Jr. ............ | B60J 5/06 192/104 B |
| 5,588,258 | A * | 12/1996 | Wright .................. | E05F 15/627 49/340 |
| 5,816,444 | A * | 10/1998 | David ..................... | F41B 11/55 221/289 |
| 6,068,097 | A * | 5/2000 | Kurita ..................... | F16D 43/02 192/223.2 |
| 6,481,557 | B2 * | 11/2002 | Denis ..................... | B60N 2/167 192/15 |
| 8,226,456 | B2 * | 7/2012 | Chang ..................... | B24B 45/00 451/340 |
| 2001/0047625 | A1 * | 12/2001 | Sedlak ..................... | E05F 15/63 49/341 |
| 2006/0042166 | A1 * | 3/2006 | Berklich ............... | E05F 1/1091 49/341 |
| 2008/0048514 | A1 * | 2/2008 | Hoffmann ................. | H02K 7/06 310/78 |
| 2009/0000902 | A1 * | 1/2009 | Gresley ................ | H02K 7/1166 192/223.2 |
| 2011/0271776 | A1 * | 11/2011 | Reif ......................... | B60J 5/101 74/25 |
| 2014/0251748 | A1 * | 9/2014 | McCrary ................. | F16D 19/00 192/94 |

FOREIGN PATENT DOCUMENTS

| | | |
|---|---|---|
| DE | 102008061120 | 6/2010 |
| DE | 102010013622 | 11/2010 |
| EP | 2196699 | 6/2010 |
| WO | 0020247 | 4/2000 |
| WO | 2007014686 | 2/2007 |
| WO | 2013045099 | 4/2013 |

OTHER PUBLICATIONS

"International Search Report," for PCT/EP2012/004062, mailed Dec. 17, 2012 (3 pages).
"International Written Opinion," for PCT/EP2012/004062, with translation, mailed Apr. 14, 2014 (10 pages).

* cited by examiner

DRIVE ARRANGEMENT FOR AN ADJUSTING ELEMENT OF A MOTOR VEHICLE

CROSS-REFERENCE TO RELATED APPLICATIONS

This application is a national stage application under 35 U.S.C. 371 of International Patent Application Serial No. PCT/EP2012/004062, entitled "Antriebsanordnung für ein Verstellelement eines Kraftfhrzeugs," filed Sep. 27, 2012, which claims priority from German Patent Application No. DE 20 2011 106 110.1, filed Sep. 27, 2011, the disclosures of which are incorporated herein by reference.

FIELD OF THE INVENTION

The invention relates to a drive arrangement for an adjusting element of a motor vehicle.

BACKGROUND

In the present case, the expression "adjusting element" is to be understood comprehensively. It includes rear hatches, rear lids, engine hoods, doors, in particular side doors, trunk compartment floors or the like of a motor vehicle.

Primarily, however, the drive arrangement in question is used in rear hatches and side doors of motor vehicles. It serves for the motorized adjustment of the respective adjusting element in the closing direction and in the opening direction. It is important here as a rule that, in addition to the motorized adjusting operation, the drive arrangement also permits manual adjusting operation. Furthermore, it is important here that the respective hatch or door position is held reliably in the case of a power failure, in order to avoid hatch or door movements which are unexpected and therefore dangerous to the user.

The known drive arrangement (WO 2007/014686 A1), from which the invention proceeds, is equipped with a clutch arrangement which is connected into the power train with a drive connection and a driven connection, which is a wrap spring arrangement. The wrap spring arrangement forwards a movement which is introduced on the drive side to the drive connection and brakes a movement which is introduced on the output side, with the result that the rear hatch can be held reliably in every intermediate position. The known drive arrangement with a wrap spring arrangement is of structurally simple and robust construction. In the case of a suitable design of the wrap spring, satisfactory switching behavior can be achieved with regard to the switchover between drive operation and braking operation.

Clutch arrangements which forward a movement which is introduced on the drive side to a drive connection and block movements which are introduced on the output side are also known from the prior art (DE 195 81 436 C1). Locking mechanisms of this type are equipped with three pairs of clamping roller freewheels which operate in opposite directions. Braking operation in the above sense cannot be realized by way of clamping locking mechanisms of this type.

The invention is based on the problem of configuring and developing the known drive arrangement in such a way that the switching behavior is improved with regard to the switchover between drive operation and braking operation.

SUMMARY

The consideration is essential of combining a braking arrangement having a braking element which can be adjusted counter to a braking force with a freewheel arrangement comprising clamping body freewheels in such a way that a movement which is introduced on the drive side is forwarded to the drive connection and a movement which is introduced on the output side is braked.

In detail, the freewheel arrangement is arranged between the driven connection and the braking element and has at least one pair of clamping body freewheels which operate in opposite directions, which pair will be called "freewheel pair" in the following text.

In the present case, a clamping body freewheel is defined by the fact that it blocks in a first movement direction, that is to say couples the components which are connected to the clamping body freewheel to one another, and releases in a second movement direction which is opposed to the first movement direction, that is to say brings about a freewheel between the components which are connected to the clamping body freewheel. The blocking and releasing takes place in a manner which is known per se by way of an automatic, direction-dependent adjustment of the clamping bodies.

By virtue of the fact that at least one freewheel pair of clamping body freewheels which operate in opposite directions is provided, a movement which is introduced on the output side always leads to blocking of at least one clamping body freewheel, whereas the respectively other clamping body freewheel of said freewheel pair is released. The blocking between the driven connection and the braking element which can be adjusted only counter to a braking force leads to the movement which is introduced on the output side always being braked via the braking arrangement. The expression "always" means here that the blocking takes place in both output-side movement directions.

In order to ensure that a movement which is introduced on the drive side is not also braked by way of the braking arrangement, it is provided in accordance with one proposal, furthermore, that a movement which is introduced on the drive side always brings about the release of all clamping body freewheels. Here too, the expression "always" means that the described effect is provided for both drive-side movement directions.

In an embodiment, the clamping body freewheels are in each case clamping roller freewheels having clamping bodies which are configured in each case as a clamping roller. In the realization of an above clamping roller freewheel, the fact that the movement which is triggered on the drive side is forwarded in a largely unbraked manner to the driven connection is particularly advantageous. Correspondingly, the clutch arrangement does not have a negative effect on the overall degree of efficiency of the drive arrangement.

Furthermore, the fact is advantageous that, in use in accordance with normal operation, the coupling between the drive connection and the driven connection or between the driven connection and the braking element can be designed with minimal play, with the result that a correspondingly low development of noise is to be expected during switchover between drive operation and braking operation.

According to a further teaching, an adjusting element arrangement per se is claimed which has an adjusting element and an above-described drive arrangement which is assigned to the adjusting element. Reference may be made to all comments with respect to the drive arrangement in accordance with the proposal, which comments are suitable to describe the adjusting element arrangement overall.

In an embodiment, the braking arrangement is designed precisely in such a way that it firstly holds the adjusting element in every intermediate position and secondly permits manual adjustment counter to the braking force of the braking arrangement. In the case of a design of this type, all factors which possibly influence an automatic adjusting element movement are to be taken into consideration. These include weight, spring forces, friction forces or the like.

In an embodiment, the invention provides a drive arrangement for an adjusting element of a motor vehicle, a clutch arrangement which is connected into the drive train being provided with a drive connection and a driven connection, the clutch arrangement at any rate forwarding a movement which is introduced on the drive side to the driven connection and having a braking arrangement for braking a movement which is introduced on the output side, wherein the braking arrangement has a braking element which can be adjusted counter to a braking force, in that, between the output connection and the braking element, the clutch arrangement has a freewheel arrangement comprising at least one freewheel pair of clamping body freewheels which operate in opposite directions, in that a movement which is introduced on the output side always brings about the blocking of at least one clamping body freewheel and is correspondingly braked via the braking arrangement, and in that a movement which is introduced on the drive side always brings about the release of the clamping body freewheels.

In an embodiment, the braking element is coupled to at least one brake disk which is/are pressed by means of a spring element in a non-positive manner against a stationary friction component, in particular against a housing part.

In an embodiment, the braking element is of cup-like configuration at least in sections and substantially receives the freewheel arrangement.

In an embodiment, the clamping body freewheels have in each case one clamping body which is configured as a rolling body, in particular as a clamping roller or as a clamping ball, and in that the clamping bodies of a freewheel pair are enclosed in a functional section between an inner rotational body and an outer rotational body.

In an embodiment, the clutch arrangement is assigned a geometric clutch axis, and in that the inner rotational body and the outer rotational body are oriented toward the clutch axis, and/or in that the braking element and/or the at least one brake disk are/is oriented toward the clutch axis.

In an embodiment, in a functional section, one rotational body is circular and the other rotational body differs from a circular form, in each case in cross section, in such a way that in each case one clamping region is formed on both sides of a center region in the circumferential direction, and optionally in that a spring element is arranged in the center region, which spring element presses the two clamping bodies against one another and therefore into the clamping regions.

In an embodiment, a relative rotation of the two rotational bodies with respect to one another brings about rolling of a clamping body of a freewheel pair on both rotational bodies, as a result of which, in the clamping region, the clamping body comes into locking clamping engagement with the two rotational bodies.

In an embodiment, the rotational body which is circular in cross section is assigned to the braking element, and in that the other rotational body is assigned to the driven connection.

In an embodiment, a third rotational body is provided which can be oriented toward the clutch axis, a drive force acting on the clamping bodies in the circumferential direction in the case of the rotation of said third rotational body, which drive force moves the clamping bodies out of locking clamping engagement and therefore releases the clamping body freewheels, and optionally in that the force action line of the drive force runs substantially through the center axis or the center point of the clamping bodies.

In an embodiment, in the case of its rotation, the third rotational body drives one of the two other rotational bodies, in particular the output-side rotational body, via the clamping bodies.

In an embodiment, the third rotational body is assigned to the drive connection.

In an embodiment, the drive-side rotational body is in a positively locking engagement which is affected by play with the output-side rotational body, with the result that, before the play is moved through, a relative rotation for the release of the clamping engagement and possibly the driving of the output-side rotational body via the clamping bodies is possible and, after the play is moved through, driving of the output-side rotational body is possible via the positively locking connection.

In an embodiment, the invention provides an adjusting element arrangement having an adjusting element and a drive arrangement which is assigned to the adjusting element as described herein.

In an embodiment, the adjusting element is configured as a hatch, such as a rear hatch, or as a door, such as a side door, of a motor vehicle.

In an embodiment, the braking arrangement is designed in such a way that it holds the adjusting element, such as in every intermediate position, in particular counter to weight forces and optionally present spring forces, and, moreover, permits manual adjustment of the adjusting element counter to the braking force of the braking arrangement.

BRIEF DESCRIPTION OF THE FIGURES

In the following text, the invention will be explained in greater detail using the drawing which shows merely one exemplary embodiment. In the drawing.

DETAILED DESCRIPTION

Figure 1:
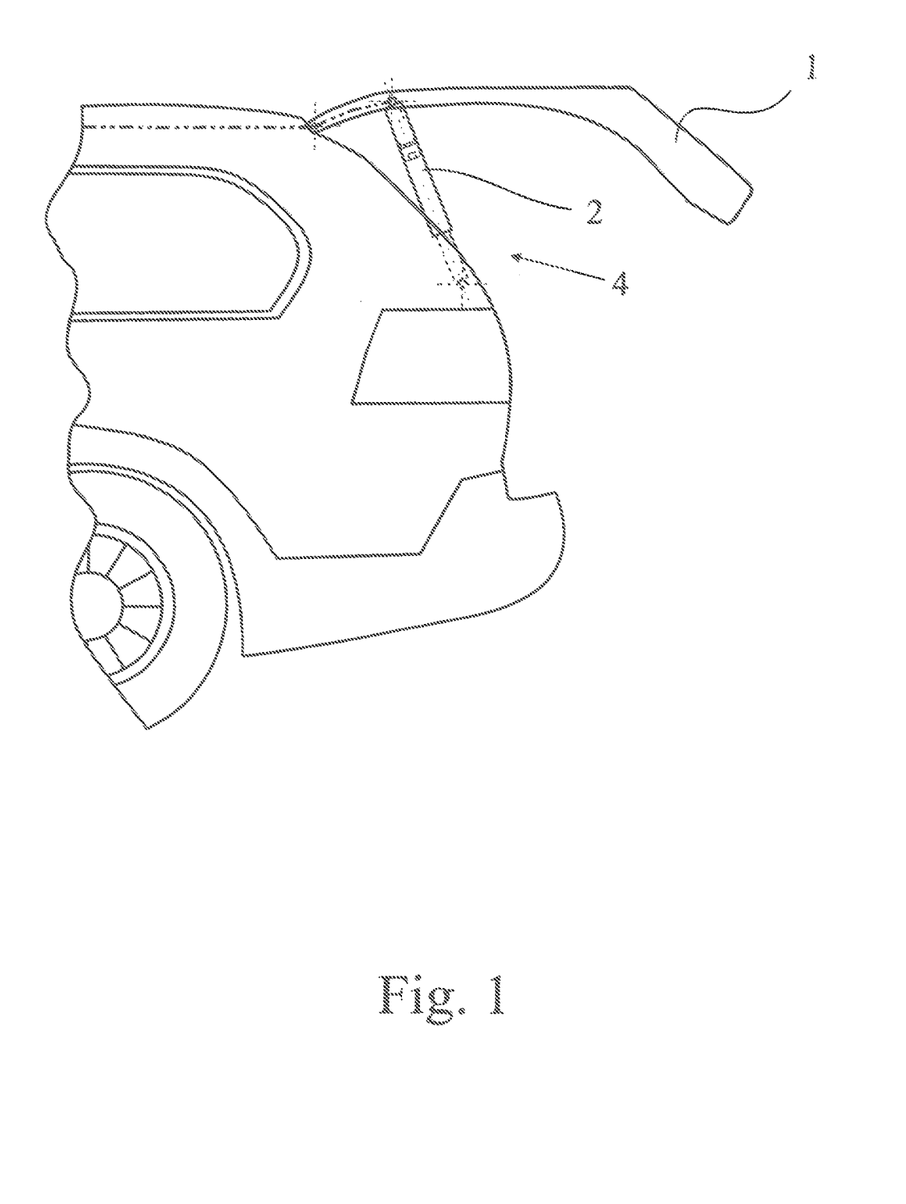
FIG. 1 shows the rear of a motor vehicle in a side view with a rear hatch and a drive arrangement in accordance with the proposal for the motorized adjustment of the rear hatch.

The drive arrangement which is shown in FIG. 1 serves for the motorized adjustment of a rear hatch 1 of a motor vehicle. However, all other adjusting elements which are addressed in the introductory part of the description can also be used advantageously. All the following comments with respect to a rear hatch likewise apply correspondingly to all other adjusting elements which are addressed there.

Figure 2:
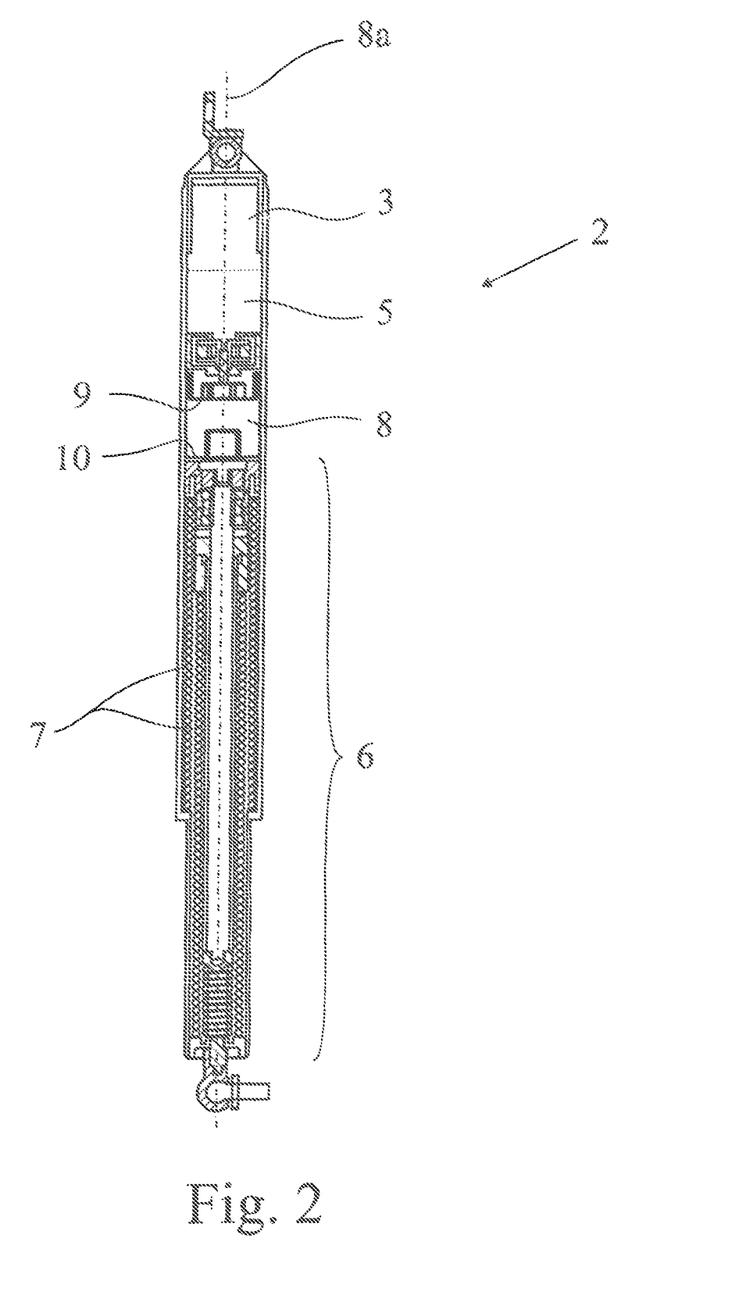
FIG. 2 shows one of the two drives of the drive arrangement according to FIG. 1 in a partial longitudinal section.

The drive arrangement which is shown in FIG. 1 is assigned two identical drives 2 which have in each case one drive motor 3. The drives 2 are arranged in the two lateral regions of a rear hatch opening 4. FIG. 1 shows only one of the two drives 2. FIG. 2 shows said drive 2 in a partial longitudinal section.

The following comments relate only to the one drive 2 which can be seen in FIG. 1. However, they apply likewise to further possibly present drives.

The drive 2 which is shown in FIG. 2 is equipped as a spindle drive with a drive motor 3, an intermediate gear mechanism 5 and a spindle/spindle nut mechanism 6, a spring arrangement 7 ensuring that the spindle/spindle nut mechanism 6 is prestressed into the extended position. FIG. 1 shows the installed state of the spindle drive.

A clutch arrangement 8 which is equipped in a customary way with a drive connection 9 and a driven connection 10 is connected into the drive train between the intermediate gear mechanism 5 and the spindle/spindle nut mechanism 6.

In accordance with the proposal, the clutch arrangement 8 is concerned not only with the forwarding of movements which are introduced on the drive side to the driven connection 10, but also with a braking function. In detail, a braking arrangement 11 is provided for braking a movement which is introduced on the output side, which braking arrangement 11 has a braking element 12 which can be adjusted counter to a braking force.

It is essential then that a movement which is introduced on the output side is braked by way of the braking arrangement 11, whereas a movement which is introduced on the drive side is forwarded in an un-braked manner to the driven connection 10. For this purpose, the clutch arrangement 8 has, between the drive connection 9 and the braking element 12, a freewheel arrangement 13 comprising three (in this case) pairs 14 of clamping body freewheels 15 which operate in opposite directions and, in relation to the clutch axis 8a, are arranged offset by 120°. In the present case, as has already been addressed, said three pairs 14 of clamping body freewheels 15 which operate in opposite directions are called "freewheel pairs". The basic construction of the freewheel pairs 14 results from a combination of FIGS. 3 and 4 and will be explained in detail further below.

Figure 5:
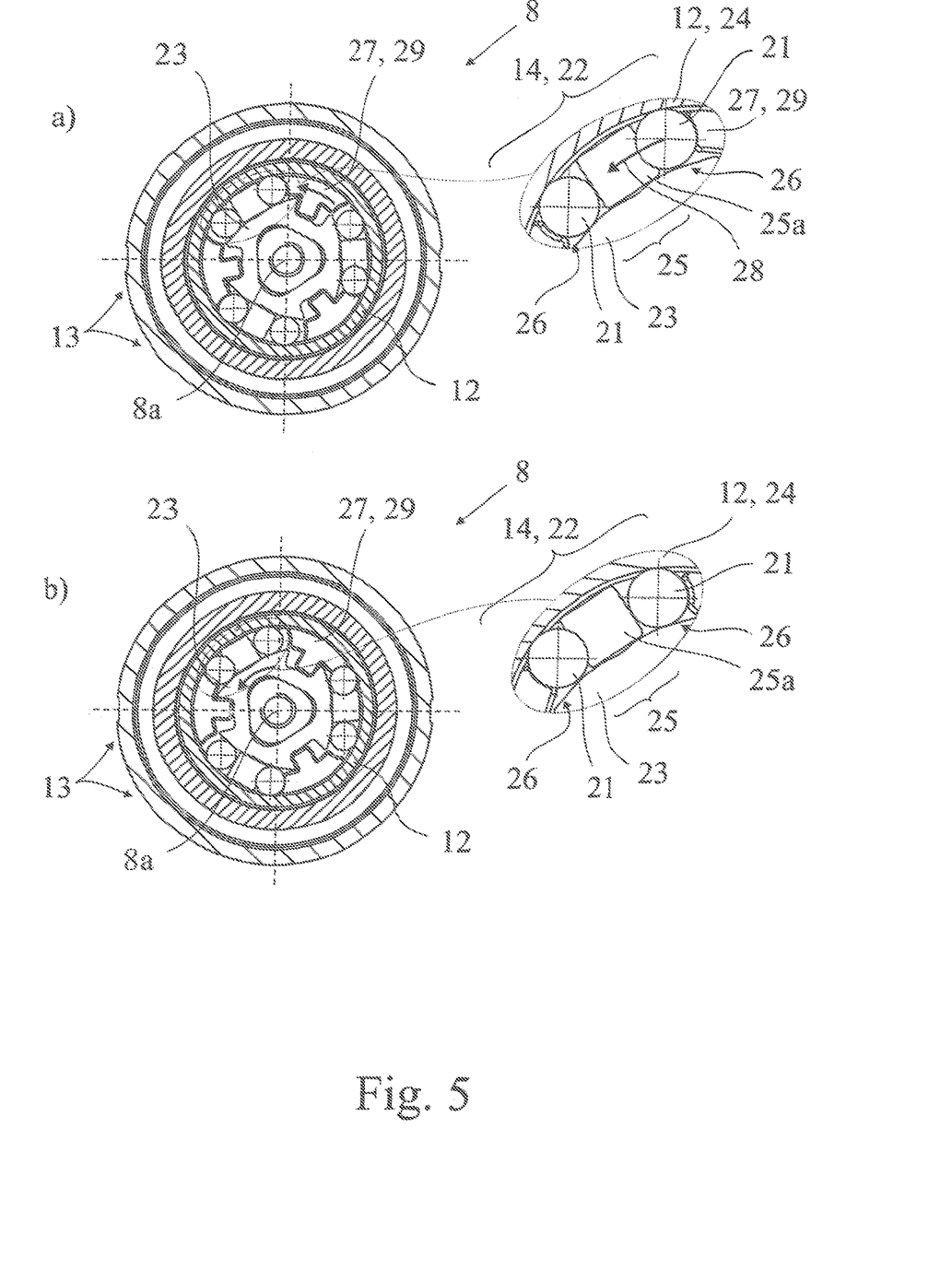
FIG. 5 shows the clutch arrangement according to FIG. 4 a) in the case of a movement which is introduced on the drive side and b) in the case of a movement which is introduced on the output side.

The arrangement is then provided in such a way that a movement which is introduced on the output side always brings about the blocking of at least one clamping body freewheel 15 and is braked correspondingly via the braking arrangement 11 (FIG. 5b), and that a movement which is introduced on the drive side always brings about the release of the clamping body freewheels 15 (FIG. 5a)). This will also be explained in detail further below.

In the exemplary embodiment which is shown, the braking arrangement 11 is of very particularly simple construction. The braking element 12 is coupled to two (in this case) brake disks 16, 17 which are pressed in a non-positive manner by means of a spring element 18 against a stationary friction component 19, in this case against a housing part. It is interesting here that the braking element 12 has a pin-shaped section 12a which is introduced into a hole of a housing part which provides the friction component 19. The brake disks 16, 17 which are connected fixedly to the pin so as to rotate with it, for example by way of a positively locking connection, are arranged on both sides of the friction component 19. By virtue of the fact that the lower (in FIG. 3) brake disk 17 is secured with a circlip or the like on its side which faces away from the friction component 19, the upwardly acting (in FIG. 3) spring force brings about pressing of the two brake disks 16, 17 against the friction component 19. The spring element 18 is a simple helical compression spring.

In the braking arrangement 11 which is shown, the fact is also interesting that the braking element 12 is of cup-like configuration at least in sections and substantially receives the freewheel arrangement 13. This leads to a very particularly compact embodiment.

It goes without saying that the drive train has to be of non-self-locking configuration at any rate between the drive connection 9 of the clutch arrangement 8 and the adjusting element 1, in order to permit the braked movement which is triggered on the output side. As will still be shown, the braked movement which is triggered on the output side is also forwarded to the drive connection 9 of the clutch arrangement 8, with the result that the entire drive train can be of non-self-locking configuration.

Figure 3:
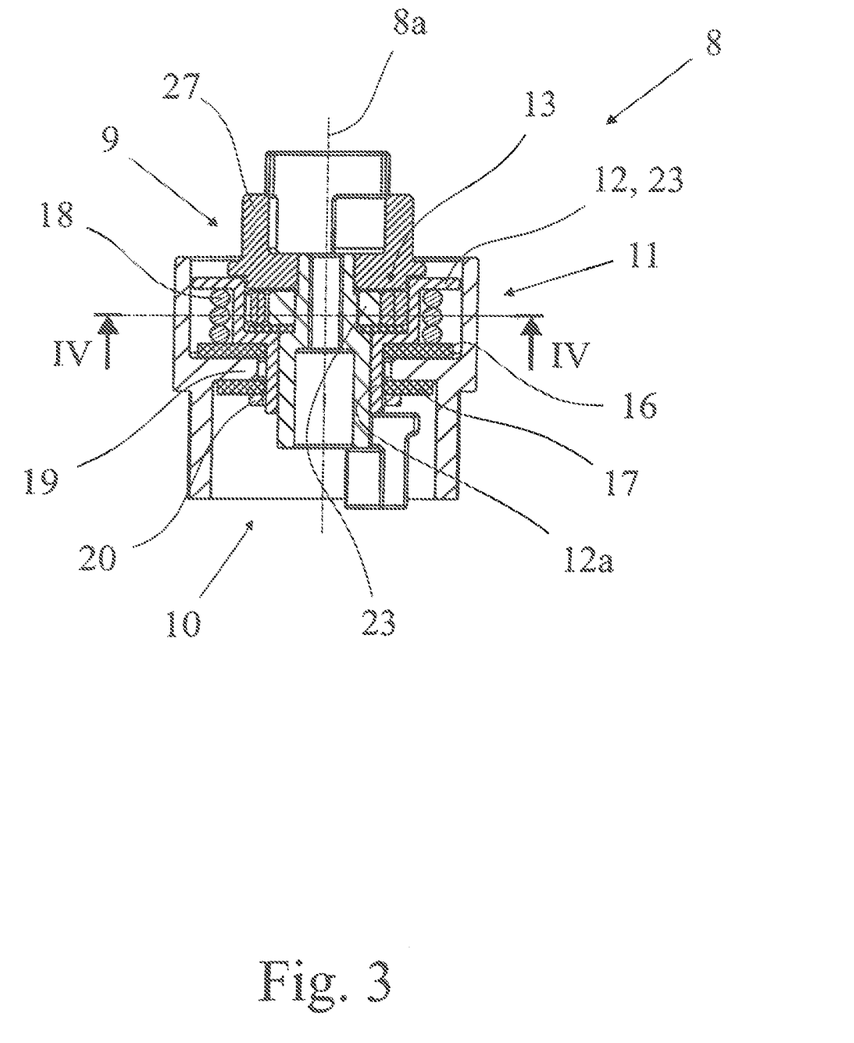
FIG. 3 shows the clutch arrangement of the drive arrangement according to FIG. 1 in a longitudinal section.
Figure 4:
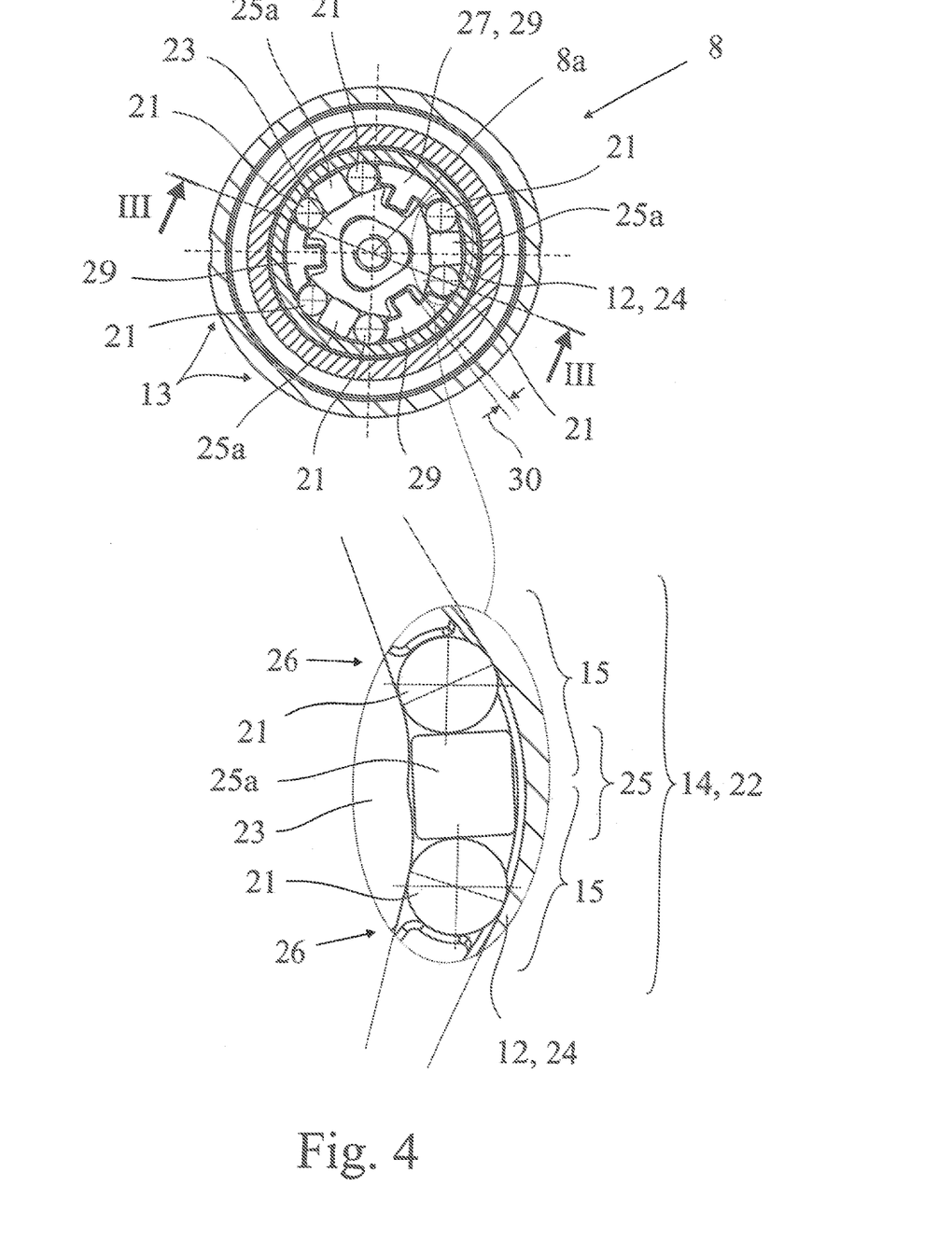
FIG. 4 shows the clutch arrangement according to FIG. 3 in a sectional view along the sectional line IV-IV.

A combination of FIGS. 3 to 5 shows that the clamping body freewheels 15 have in each case one clamping body 21 which is configured as a rolling body, in this case as a clamping roller. It is also conceivable that the clamping bodies 21 are configured as clamping balls. The clamping bodies 21 of a freewheel pair 14 are enclosed in a functional section 22 between an inner rotational body 23 and an outer rotational body 24. The functional section 22 provides a volume which the clamping bodies 21 cannot leave. It may already be noted here that the functional sections 22 move with a movement of the driven connection 10.

The great compactness of the clutch arrangement 8 in accordance with the proposal is shown at this point. The clutch arrangement 8 is assigned a clutch axis 8a, in this case the inner rotational body 23, the outer rotational body 24, the braking element 12 and the brake disks 16, 17 being oriented toward the clutch axis 8a. In principle, a different orientation of individual abovementioned components can be provided.

In the large illustration, FIG. 4 shows that, in the functional section 22 there, one rotational body 24 is circular and the other rotational body 23 differs from a circular shape, in cross section, in such a way that in each case one clamping region 26 is formed on both sides of a center region 25 in the circumferential direction. In FIG. 4, the tangential lines which are shown using dashed lines indicate that, in the clamping regions 26, in each case in cross section, those wall sections of the two rotational bodies 23, 24 which face the clamping bodies 21 form in each case one wedge-like constriction in the circumferential direction, starting from the center region 25, with the result that the clamping bodies 21 cannot leave the respective functional section 22.

FIG. 4 shows that a spring arrangement 25a is arranged in the center region 25, which spring element 25a presses the two clamping bodies 21 of a freewheel pair 14 against one another and therefore into the clamping regions 26. The spring element 25a can be a helical compression spring or, as here, an elastomer component or the like.

The blocking of the freewheel arrangement 13 results from a relative rotation of the two rotational bodies 23, 24 with respect to one another, which relative rotation can be retraced here to a movement which is introduced on the output side. In the large illustration in FIG. 5b), a rotation of the inner rotational body 23 to the left brings about rolling of the right-hand (in this illustration) clamping body 21 on both rotational bodies 23, 24, as a result of which the clamping body 21 in the clamping region 26 comes into blocking clamping engagement with the two rotational bodies 23, 24.

By virtue of the fact that the one rotational body 24, which is circular in cross section and is the outer rotational body 24 here, is assigned to the braking element 12 and that the other rotational body 23, the inner rotational body 23 here, is assigned to the driven connection 10, a movement which is introduced on the output side is braked by way of the braking arrangement 11. The same applies to a movement which is introduced on the output side in the opposite direction, the clamping body 21 which is shown on the left in the large illustration in FIG. 5 coming into blocking clamping engagement with both rotational bodies 23, 24.

The release of the freewheel arrangement 13 by way of a movement which is introduced on the drive side is then interesting. For this purpose, a third rotational body 27 which is advantageously oriented toward the clutch axis 8*a* is provided, a drive force 28 acting on the clamping bodies 21 in the circumferential direction in the case of the rotation of the said third rotational body 27, bringing the clamping bodies 21 out of clamping engagement as a result and releasing the clamping body freewheels 15. Here, in this case, the force action line of the drive force 28 runs through the center axis or the center point of the clamping bodies 21. This can be gathered best from the illustration according to FIG. 5*a*). The large illustration there shows that the third rotor body 27 acts with the drive force 28 on the right-hand (in the large illustration) clamping body 21, which leads to said clamping body 21 being pressed to the left in the large illustration out of the clamping region 26. Via the slightly compressed spring element 25*a*, the drive force 28 also acts on the left-hand (in the large illustration in FIG. 5) clamping body 21. However, no blocking clamping engagement is possible for said clamping body 21, since rolling on the abovementioned wall sections of the rotational bodies 23, 24 would always lead out of the clamping region 26. Since, as explained above, the clamping body 21 which is shown on the left in the large illustration in FIG. 5*a*) cannot leave the associated functional section 22, an equilibrium state is produced as a result, in such a way that, during its rotation, the third rotational body 27 drives the inner rotational body 23, the output-side rotational body 23 here, via the clamping bodies 21.

In this case, the third rotational body 27 is assigned to the drive connection 9 of the clutch arrangement 8, with the result that, as explained above, a movement which is introduced on the drive side is forwarded in an unbraked manner to the driven connection 10.

In the exemplary embodiment which is shown in the drawing, the fact is interesting that the third rotational body 27 is in a positively locking engagement which is affected by play with the output-side rotational body 23. For this purpose, the third rotational body 27 is assigned at least one claw 29 which engages between two above-described functional sections 22. The arrangement, in particular the at least one claw 29, is then produced in such a way that, before the play 30 is moved through, a relative rotation between the drive-side rotational body 27 and the output-side rotational body 23 for the release of the clamping engagement and the above-described driving of the output-side rotational body 23 via the clamping bodies 21 is possible, driving of the output-side rotational body 23 via the positively locking connection being possible after the play 30 is moved through. The positively locking connection therefore becomes active here only after the play 30 is moved through, which is associated with corresponding compression of the spring element 25*a*. Depending on the spring rate and prestress of the spring element 25*a*, this state is achieved only at a correspondingly high operating moment between the drive connection 9 and the driven connection 10.

In principle, it can be provided that the above positively locking connection becomes active only in the case of overloading, and not in use in accordance with normal operation. In particular, the fact is advantageous here that the spring element 25*a* acts as a damping element within the drive train, which can advantageously reduce the development of noise.

In accordance with a further teaching which is given independent significance, an adjusting element arrangement with an adjusting element 1 which is configured, in particular, as a rear hatch and an above-described drive arrangement which is assigned to the adjusting element 1 is claimed. Reference may be made to all comments with respect to the drive arrangement in accordance with the proposal.

The solutions in accordance with the proposal can be applied to all possible adjusting elements 1 of a motor vehicle. The adjusting element 1 can be a rear hatch, a rear lid, an engine hood, a door, in particular a side door, or a trunk compartment floor of a motor vehicle.

The adjusting element arrangement in accordance with the proposal can be designed in a very special way. In detail, the braking arrangement 11 is designed in such a way that it can hold the adjusting element 1 in every intermediate position, in particular counter to weight and possibly present spring forces, and, moreover, permits a manual adjustment of the adjusting element 1 counter to the braking force of the braking arrangement 11. Here, the spring forces are retraced, for example, to the forces of the spring arrangement 7 which is addressed above.

In an embodiment, which was mentioned last ensures that an unexpected adjustment of the adjusting element 1 does not occur even in the case of a power failure, the possibility of manual adjustment counter to the braking force of the braking arrangement 11 always remaining.

Finally, reference may be made to the fact that a cable drive, a cable mechanism or a cable pull can be connected into the drive train of the drive arrangement in a further embodiment.

The invention claimed is:

1. A drive arrangement for an adjusting element of a motor vehicle, comprising:
   a clutch arrangement which is connected into a drive train, wherein the drive train comprises a drive side and an output side;
   a drive connection;
   a driven connection; and
   a braking arrangement;
   wherein a movement introduced on the drive side is forwarded by the clutch arrangement to the driven connection;
   wherein a movement introduced on the output side is braked by the braking arrangement;
   wherein the braking arrangement has a braking element which can be adjusted counter to a braking force between the driven connection and the braking element;
   wherein the clutch arrangement has a freewheel arrangement comprising at least one freewheel pair of clamping body freewheels wherein a clamping body freewheel in the at least one pair of clamping body freewheels operates in an opposite from a second clamping body freewheel in the at least one pair of clamping body freewheels;
   wherein the movement introduced on the output side always brings about blocking of at least one of the clamping body freewheels in the at least one pair of clamping body freewheels and is correspondingly braked via the braking arrangement, and wherein the movement which is introduced on the drive side always brings about the release of the clamping body freewheels in the at least one pair of clamping body freewheels.

2. The drive arrangement as claimed in claim 1, wherein the braking element is coupled to at least one brake disk which is pressed by a spring element in a non-positive manner against a stationary friction component.

3. The drive arrangement as claimed in claim 1, wherein the braking element is of cup-like configuration at least in sections and receives the freewheel arrangement.

4. The drive arrangement as claimed in claim 1, wherein each of the clamping body freewheels of the at least one freewheel pair has a clamping body which is configured as a rolling body, and in that the clamping bodies are enclosed in a functional section between an inner rotational body and an outer rotational body.

5. The drive arrangement as claimed in claim 4, wherein the clutch arrangement is assigned a geometric clutch axis, and wherein the inner rotational body and the outer rotational body are oriented toward the clutch axis, or either the braking element or the at least one brake disk is oriented toward the clutch axis.

6. The drive arrangement as claimed in claim 4, wherein, in the functional section, one rotational body of the inner rotational body and the outer rotational body has a circular cross-section and the other rotational body of the inner rotational body and the outer rotational body differs from a circular cross-section in such a way that in each case a clamping region is formed on both sides of a center region in the circumferential direction.

7. The drive arrangement as claimed in claim 6, wherein a relative rotation of the inner rotational body and the outer rotational body with respect to one another brings about rolling of at least one clamping body of the clamping bodies of the at least one freewheel pair, as a result of which, in the clamping region, the clamping body comes into locking clamping engagement with the inner rotational body and the outer rotational body.

8. The drive arrangement as claimed in claim 6, wherein the rotational body of the inner rotational body and the outer rotational body which is circular in cross section is assigned to the braking element, and in that the other rotational body of the inner rotational body and the outer rotational body is assigned to the driven connection.

9. The drive arrangement as claimed in claim 5, wherein a third rotational body is provided, a drive force acting on the clamping bodies in the circumferential direction in the case of the rotation of said third rotational body, which drive force moves the clamping bodies out of locking clamping engagement and therefore releases the clamping body freewheels.

10. The drive arrangement as claimed in claim 4, wherein, in the case of a third rotation body's rotation, the third rotational body drives one of the inner rotational body or the outer rotational body via the clamping bodies.

11. The drive arrangement as claimed in claim 10, wherein the third rotational body is assigned to the drive connection.

12. The drive arrangement as claimed in claim 11, wherein a drive-side rotational body is in a positively locking engagement which is affected by a play with an output-side rotational body, with the result that, before the play is moved through, a relative rotation for the release of the clamping engagement and possibly the driving of the output-side rotational body via the clamping bodies is possible and, after the play is moved through, driving of the output-side rotational body is possible via the positively locking connection.

13. An adjusting element arrangement having an adjusting element and a drive arrangement as claimed in claim 1, wherein the drive arrangement is assigned to the adjusting element.

14. The adjusting element arrangement as claimed in claim 13, wherein the adjusting element is configured as a hatch, or as a door, of a motor vehicle.

15. The adjusting element arrangement as claimed in claim 13, wherein the braking arrangement is designed in such a way that it holds the adjusting element and, moreover, permits manual adjustment of the adjusting element counter to the braking force of the braking arrangement.

16. The drive arrangement as claimed in claim 6, wherein a spring element is arranged in the center region, which spring element presses the two clamping bodies against one another and therefore into the clamping regions.

17. The drive arrangement as claimed in claim 9, wherein the third rotational body is oriented toward the clutch axis.

18. The drive arrangement as claimed in claim 9, wherein a force action line of the drive force runs through either a center axis or a center point of the clamping bodies.

19. The adjusting element arrangement as claim in claim 14, wherein the hatch comprises a rear hatch.

20. The adjusting element arrangement as claimed in claim 15, wherein the braking arrangement is designed in such a way that it holds the adjusting element in every intermediate position.

* * * * *